United States Patent
Okamitsu et al.

(10) Patent No.: US 6,777,826 B2
(45) Date of Patent: Aug. 17, 2004

(54) ANTI-THEFT SYSTEM FOR VEHICLE (75) Inventors: Atsushi Okamitsu, Hiroshima (JP);
Shinji Mori, Higashihiroshima (JP);
Manabu Takeshige, Hiroshima (JP);
Teruo Yoshii, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 224 days.

(21) Appl. No.: 09/950,330

(22) Filed: Sep. 10, 2001

(65) Prior Publication Data

US 2002/0041125 A1 Apr. 11, 2002

(30) Foreign Application Priority Data

Sep. 13, 2000 (JP) ........................................ 2000-277540
Sep. 13, 2000 (JP) ........................................ 2000-277542

(51) Int. Cl.[7] .............................................. B60R 25/04
(52) U.S. Cl. ...................................................... 307/10.5
(58) Field of Search ............................... 307/10.2, 10.3; 123/198 DB, 198 DC; 180/287

(56) References Cited

U.S. PATENT DOCUMENTS

| 4,965,460 | A |   | 10/1990 | Tanaka et al. | |
|---|---|---|---|---|---|
| 5,561,332 | A | * | 10/1996 | Udo et al. | 307/10.5 |
| 5,646,456 | A | * | 7/1997 | Udoh et al. | 307/10.5 |
| 5,684,454 | A | * | 11/1997 | Nishioka et al. | 340/426.12 |
| 5,703,413 | A | * | 12/1997 | Treharne | 307/10.5 |
| 5,708,307 | A |   | 1/1998 | Iijima et al. | |
| 5,763,958 | A | * | 6/1998 | Yamamoto et al. | 307/10.5 |
| 5,861,816 | A | * | 1/1999 | Funakoshi et al. | 340/5.31 |
| 6,025,653 | A | * | 2/2000 | Hayashi et al. | 290/33 |
| 6,043,568 | A | * | 3/2000 | Matsumoto et al. | 307/10.5 |
| 6,084,531 | A | * | 7/2000 | Caprathe et al. | 340/825.69 |
| 6,144,113 | A | * | 11/2000 | Hayashi et al. | 307/10.5 |
| 6,326,705 | B1 | * | 12/2001 | Yano | 307/10.2 |

FOREIGN PATENT DOCUMENTS

| DE | 4413922 | 10/1995 |
|---|---|---|
| EP | 0 893 316 A1 | 1/1999 |
| FR | 2754226 | 4/1998 |
| JP | 08185581 | 7/1996 |
| JP | 10-53106 | 2/1998 |

* cited by examiner

Primary Examiner—Gregory J. Toatley, Jr.
(74) Attorney, Agent, or Firm—Brooks Kushman P.C.

(57) ABSTRACT

An anti-theft system for a vehicle includes a first control unit (an ammobilizer) that makes a collation of a key code of an individual key inserted in an ignition key with a reference key code representative of an intrinsic key exclusive to an engine of the vehicle stored in an EEPROM, stores data of a result of the collation, agreement or disagreement between the two key codes, in a B/URAM, and provides a second control unit for controlling engine operation with an instruction, an approval instruction for permitting the engine to operate or a refusal instruction for prohibit the engine from operating, according to the collation result that is stored in the B/URAM.

15 Claims, 10 Drawing Sheets

ANTI-THEFT SYSTEM FOR VEHICLE

BACKGROUND OF THE INVENTION

1. Field of the Invention

The present invention relates to an anti-theft system for a vehicle.

2. Description of Related Art

There have been various anti-theft systems for vehicles. One of the anti-theft systems that is rapidly becoming popular employs an anti-theft control unit called an immobilizer (a first control unit) that cooperates with an engine control unit (second control unit) for controlling engine operation such as fuel injection and ignition timing.

One of the anti-theft systems of this type which employ immobilizers is known from, for example, Japanese Unexamined Patent Publication No.10-53106. This prior art anti-theft system comprises key code read means for reading a first key code or individual key code identifying an individual key that is inserted into an ignition switch of a vehicle equipped with the anti-theft system, a first control unit (immobilizer) operative to receive a signal representative of the first key code through the key code read means and a second control unit that controls operation of the engine such as fuel injection and ignition timing. When the ignition switch is turned on, the second control unit sends a request signal to the first control signal so as to cause the first control unit to start reading in the first key code. The first control unit collates the first key code with a second key code or reference key code that the first control unit stores in a memory. When the first key code agrees with the second key code, the key is justified as an intrinsic key for the vehicle, then, the first control unit sends back an instruction of approval (which is hereafter referred to as an approval instruction) to the second control unit so as to permit the engine to operate. On the other hand, when the first key code disagrees with the second key code, the key is denied to be intrinsic, then, the first control unit sends back an instruction of refusal (which is hereafter referred to as a refusal instruction) to the second control unit so as to prohibit the engine from operating.

The prior art anti-theft system disclosed in the publication mentioned above takes a comparatively long time before the first control unit provides the second control unit with an instruction, an approval instruction or a refusal instruction, because the first control unit starts a collation between the first and second key codes after receiving a request signal from the second control unit. This leads to a waste of long time before an engine start-up even when an intrinsic key is duly used. In order to shorten a time wasted before an engine start-up when the intrinsic key is used, it can be thought to activate the first control unit prior to activation of the second control unit so as to perform a collation between these first and second key codes in advance. In such a case, however, the second control unit is possibly still in an inactivated condition when the first control unit sends an instruction on the basis of a result of the collation to the second control unit. In light of reliable anti-theft properties, there is still room for improvement in the advance collation of the first and second key codes.

Another anti-theft system of this type which employs immobilizer is known from, for example, Japanese Unexamined Patent Publication No. 8-80811. This prior art anti-theft system includes a cut-off relay that is closed by the first control unit to supply power to a starter motor of an engine and is opened by the first control unit to shut off the power supply from the starter motor of the engine. Specifically, while the first control unit closes the cut-off relay so as to start the starter motor when a collation between the first and second key codes results in agreement, the first control unit opens the cut-off relay so as to prohibit the starter motor from starting up when a collation between the first and second key codes results in disagreement, thereby increasing the anti-theft property. In light of anti-theft properties, the anti-theft system puts the second control unit inoperative upon activation thereof and the cut-off relay left opened in its initial condition.

According to the anti-theft system, when the engine stalls for some reason or other, such as, for example, a short break in power supply to the second control unit due to noises and/or vibrations, a comparatively long time is spent before the engine is restarted up. That is, since, when trying to restart up the engine after an occurrence of a short break in power supply to the second control unit, the first control unit that continues normal operation holds the cut-off relay closed, the second control unit does not permit the engine to operate unless the first control unit provides the second control unit with another approval instruction even though the starter motor operates. This is because the second control unit is prohibited from being activated upon reactivation after a short break in power supply thereto.

SUMMARY OF THE INVENTION

It is an object of the present invention to provide an anti-theft system for a vehicle of a type adapted to provide a second control unit with an instruction, an approval instruction or a refusal instruction, from a first control unit on the basis of a result of a collation of a first key code identifying an individual key and a second key code stored as a reference key code in the first control unit.

It is another object of the present invention to provide an anti-theft system for a vehicle which takes only a short time before providing a second control unit with an instruction, an approval instruction or a refusal instruction, and provides the second control unit with high reliability in recognizing the instruction.

It is another object of the present invention to provide an anti-theft system for a vehicle which shortens a time spent on restarting the engine after an engine stall that is caused by deactivation of a second control unit due to a short break in power supply thereto.

The above objects are achieved by an anti-theft system for a vehicle which comprises a first control unit operative to read in a first key code, namely a key code of an individual key through key code signal receiving means and a second control unit operative to control operation of an engine of the vehicle. The first control unit comprises first memory means for storing data of a second key code as a reference key code of an intrinsic key exclusive to the engine therein, collation means for making a collation between the first key code and the second key code in the first memory means so as to determine agreement or disagreement between the first and second key codes before activation of the second control unit, second memory means such as to hold data therein upon an occurrence of a short break in power supply thereto, for storing data of a result of the collation therein, detection means for detecting activation of the second control unit, and control means for, when the detecting means detects activation of the second control unit, providing the second control unit with an approval instruction that approves operating the engine when the collation results in agreement between the first and second key codes and with a refusal instruction that refuses operating the engine when the collation results in disagreement between the first and second key codes.

With the anti-theft system, the first control unit performs a collation between the first and second key codes prior to activation of the second control unit and memorizes a result of the collation. Further, the first control unit provides the second control unit with an instruction, an approval instruction or a refusal instruction, according to the result of the collation after detection of activation of the second control unit. This shortens a time wasted before providing the second control unit with the instruction, in particular, in the event where an intrinsic key exclusive to the engine of the vehicle is used. The anti-theft system makes it reliable that the second control unit receives an instruction, in particular, in the anti-theft viewpoint, a refusal instruction when a false key is used, so as to satisfactorily perform the anti-theft function. The use of the second memory that holds data therein upon an occurrence of a short break in power supply to the first control unit guarantees the result of collation between the first and second key codes even though there occurs a short break in power supply due to noises and vibrations.

In the anti-theft system, the second control unit may provide the first control unit with a request signal both upon the activation of the second control unit and when the engine attains a specified speed of rotation. In this case the first control unit provides the second control unit with either one of the approval instruction and the refusal instruction in response to receipt of the request signal. Even when the first control unit provides the second control unit with neither an approval instruction nor a refusal instruction upon a start-up of the engine while the second control unit is left unjustly activated by a false key, the second control unit receives an instruction all over again in response to a request signal that the second control unit sends to the first control unit when the engine attains the specified speed of rotation. Accordingly, while the engine continues operation when the key is intrinsic and is, however, stopped when the key is false. This reliably prevents the vehicle from being stolen.

The first control unit may be forcibly activated when the first control unit remains inactivated upon provision of the request signal by the second control unit when the engine attains the specified speed of rotation. Further, the second control unit may be inactivated when the first control unit remains inactivated upon provision of the request signal by the second control unit when the engine attains the specified speed of rotation. These variants make it reliable to prevent the vehicle from being stolen when a false key is used to start up the engine.

Upon receipt of the request signal by the first control unit when the engine attains the specified speed of rotation, the first control unit may read in a first key code so as to make a collation between the first key code and the second key code. The second control unit is provided with either one of the approval instruction and the refusal instruction according to a result of the collation between the first key code read upon receipt of the request signal when the engine attains the specified speed of rotation and the second key code. This variant makes it more reliable to prevent the vehicle from being stolen when a false key is used to start up the engine.

The first control unit may prohibit the collation between the first key code and the second key code when failing to read in the first key code while a key is out of an ignition position and forcibly treat a result of the collation between the first key code and the second key code as disagreement when failing to read in the first key code while the key is in the ignition position. This prevents the first key code from being judged to disagree with the second key code when the intrinsic key is left half inserted in the ignition switch. In other words, this prevents an unsuccessful start-up of the engine when the intrinsic key is used. When a turn of a key is detected, it is judged that a position occupied by the key is for permitting a start-up of the engine. In such a case, the collation is treated as disagreement when a first key code fails to be read in. This variant makes it reliable to prevent the vehicle from being stolen.

The first control unit may be adapted to try to read in a first key code either a predetermined number of times or for a predetermined period of time when failing to read in the first key code when there is no turn detected and discontinue reading in the first key code when failing to read in the first key code even after the predetermined number of trials. This, on one hand, increases the possibility of regularly reading in a first key code and, on the other hand, decreases the consumption of electricity due to a repeat of the reading of first key code.

According to another preferred embodiment, the anti-theft system further comprises a cut-off relay operative to supply power to a starter motor of the engine when closed and to shut off the power from the starter motor when opened. The first control unit holds the cut-off relay open in an initial condition thereof. Because the cut-off relay is prevented from closing unless the first control unit recognizes agreement between the first and second key codes, the engine is prevented from being started up by a false key. This provides an increased reliability of the anti-theft system.

In this embodiment, the first control unit may provide the second control unit with either one of an approval instruction and a refusal instruction only upon reception of the request signal from the second control unit. Even when there occurs temporary disagreement between first and second key codes due to a short break in power supply to the first control unit, the second control unit prevents the engine from continuously remaining stopped due to the temporary disagreement the second control signal provides the first control unit with a request signal. This advantageously prevents or significantly reduces an occurrence of an accidental engine stall while the vehicle travels.

The first control unit may read in a first key code at a specified timing at a specified period so as to periodically make a collation between the first key code read in at the specified timing and the second key code. In this case, the second memory means replace the data of a precedent result of the collation with data of a result of the collation between the first key code read at the specified timing and the second key code. According to this anti-theft system, the first control unit provides the second control unit with an instruction according to updated data of a result of the collation, so that, even when the engine can be started up by activating the second control unit by the use of a false key, the engine is immediately stalled by virtue of the periodic collation. This improves the anti-theft properties.

The second control unit may be prevented from being inactivated immediately at least when the periodic collation results in disagreement. This avoids an occurrence of an accidental engine stall while the vehicle travels and brings the engine into stall at a desired timing. Further, first control unit may be provided with a cut-off relay that supplies power to a starter motor of the engine when closed and shuts off the power supply from the starter motor when opened. The first control unit controls the cut-off relay to close when the collation results in agreement between the first key code and the second key code so as to permit the starter motor to operate and to open when the collation results in disagreement between the first key code and the second key code so as to prohibit the starter motor from operating. According to the anti-theft system, while the cut-off relay that is opened when the collation results in disagreement improves the anti-theft properties, the starter motor can be put in a start immediately upon restarting the engine after an engine stall while the vehicle travels. This is preferable for the engine to restart.

BRIEF DESCRIPTION OF THE DRAWINGS

The above and other objects and features of the present invention will be clearly understood from the following detailed description when read with reference to the accompanying drawings, in which.

DETAILED DESCRIPTION OF THE PREFERRED EMBODIMENTS

Figure 1:
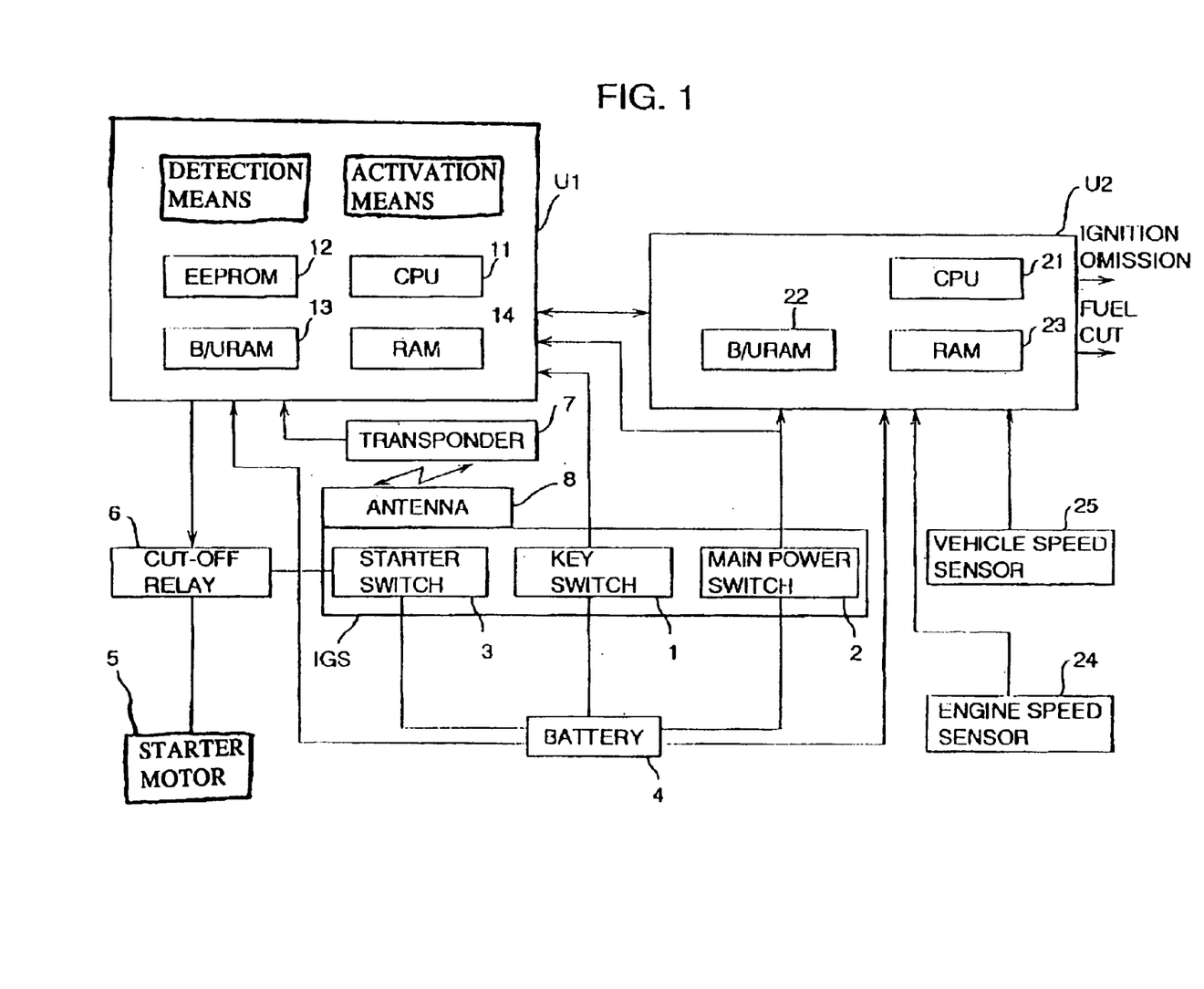
FIG. 1 is a block diagram showing an anti-theft system in accordance with a preferred embodiment of the present invention.

Referring to the drawings in detail and, in particular, to FIG. 1 showing an anti-theft system for a vehicle in accordance with a preferred embodiment of the present invention, the anti-theft system comprises a first control unit or immobilizer U1 and a second control unit or engine control unit (ECU) U2, both of which are electrically connected to an ignition switch schematically indicated by a symbol IGS. The ignition switch IGS includes a key switch 1 that is operated by a key (not shown), a main power switch 2 and a starter switch 3. These switches 1 to 3 are electrically connected to a battery 4. The key switch 1 is closed or turned on by the key inserted to a specified depth in the ignition switch IGS. This specified depth of key insertion provides ascertainment of a presence of the key in the ignition switch IGS. The key can be inserted and removed only in this keying position. The main power switch 2 is turned on or closed when the key is turned to a powering position at a specified angular separation from the keying position to activate driving devices such as an engine and a transmission that are essential for travel of the vehicle and auxiliary devices or accessories such as an audio system that bear no relation to travel of the vehicle. The starter switch 3 is turned on or closed when the key is further turned to a starting position at a specified angular separation from the powering position to start a starter motor 5 that operates to start up the engine. In this instance, the ignition switch IGS is such that the key switch 1 remains turned on even when the key is further turned to the powering position or the starting position from the keying position and that the main power switch 2 remains turned on even when the key is further turned to the starting position from the keying position. The ignition switch IGS automatically returns the key to the powering position when the key in the starting position is released. The starter motor 5 is supplied with a starting current from the starter switch 3 through a cut-off relay 6. In this instance the ignition switch IGS may have a position for actuating the accessories only between the keying position and the powering position.

The first control unit U1 is connected to a battery unit 4 through the key switch 1 and the main power switch 2. Accordingly, the first control unit U1 is activated to implement anti-theft control when the key is inserted into the ignition switch IGS and to ascertain insertion of the key in the ignition switch IGS. The first control unit U1 also controls on/off operation of the cut-off relay 6. The cut-off relay 6 is normally off or open in its initial state to cut off power supply to the starter motor 5.

The second control unit U2 is connected to the battery 4 through the main power switch 2. Accordingly, the second control unit U2 is activated to implement engine operation control when the key is turned to the powering position and to ascertain that the key is in the powering position. As the second control unit U2 is activated when the key attains the powering position, it starts the engine operation control at a timing delayed as compared with the first control unit U1 that is activated when the key reaches attains the keying position. The second control unit U2 is placed in condition for carrying out control necessary for the engine to start up upon activation.

In order to transmit information representing a first key code, namely an individual key code that the key is individually given for identification and discrimination from other keys, the key has a transponder 7 incorporated therein which provides a signal representative of the individual key code of the key. On the other hand, the ignition switch IGS is provided with a coil antenna 8 as key code receiving means through which a signal representative of the individual key code is transmitted from the transponder 7 of the key. When the key is inserted to a specified depth in the ignition switch IGS, the first control unit Ut reads in the individual key code through the key through the antenna 8.

The first control unit U1 has, in addition to a CPU 11 that manages overall control of the first control unit U1, key code memory means 12, such as an EEPROM, for storing data of a second key code, namely a reference key code, that is a key code of an intrinsic key exclusive to the engine, collation result memory means 13, such as a B/URAM, for storing data of the result of a collation between these individual and reference key codes, and a RAM 14 for temporarily storing data therein. The reference key code that is stored in the key code memory means 12 upon shipment of the vehicle is a key code representative of the intrinsic key exclusive to the engine of the vehicle. As will be described later, the CPU 11 basically has the function of collation whether or not an individual key code received through the antenna 8 agrees or disagree with the reference key code stored in the key code memory means 12, the function of storing a result of the collation and replacing the collation result with a previous collation result, and the function of providing the second control unit U2 with an instruction, i.e. an approval instruction for permitting the engine to operate or a refusal instruction for prohibiting the engine operating.

The second control unit U2 has, in addition to a Cpu 21 that manages overall control of the second control unit U2, instruction data memory means 22, such as B/URAM, for storing data of an instruction transmitted from the first control unit U1, and data memory means 23, such as a RAM, for temporarily storing data. The second control unit U2 performs control of operation of the engine basically such as control of fuel injection and ignition timing. As described later, the second control unit U2 further performs control of permitting the engine to continue operation when receiving the approval instruction from the first control unit U1 and control of forcing the engine to stop operation when receiving the refusal instruction. The forced stop of the engine is carried out by, for example, intentionally cutting fuel supply or intentionally omitting ignition. As the occasion demands, for example, when the engine starts up or when the engine attains a specified speed of rotation which is such as a lowest driving speed, for example 500 rpm, that is obtained during continue complete explosion, the second control unit U2 sends a request signal to the first control unit U1. Upon reception of the request signal, the first control unit U1 sends back an instruction, i.e. an approval instruction or a refusal instruction, to the second control unit U2. In this instance, the second control unit U2 receives a signal representative of a speed of rotation of the engine from an engine speed sensor 24 and a signal representative of a speed of the vehicle from a vehicle speed sensor 25. As shown in FIG. 1. the battery is connected directly both to first and second control units U1 and U2 to supply power, more specifically a dark current, to the B/URAMS 13 and 22 while the first and second control units U1 and U2 are in sleep mode.

Figure 2:
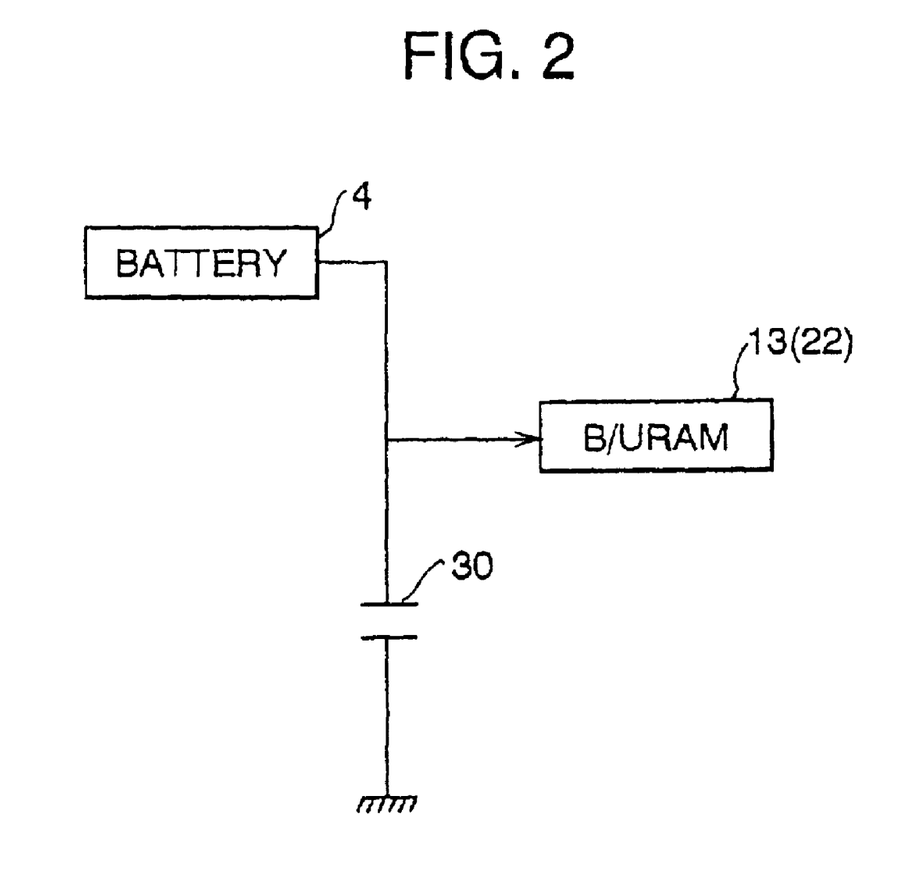
FIG. 2 is a diagram of a circuit that holds data in a memory upon an occurrence of a short break in power supply to the memory.

The B/URAMS 13 and 22 of the first and second control units U1 and U2 are such that they are protected from accidentally erasing data stored therein upon an occurrence of a short break in power supply (which refers to a state where power supply temporarily fails due to vibrations and/or noises). Accordingly, although each B/URAM 13, 22 may comprise a non-volatile memory, whereas, it is desired from a view point of cost to utilize a capacitor 30 so as to supply power to the B/URAM 13, 22 for a specified period of time upon an occurrence of a short break in power supply, as shown in FIG. 2.

Figure 3A:
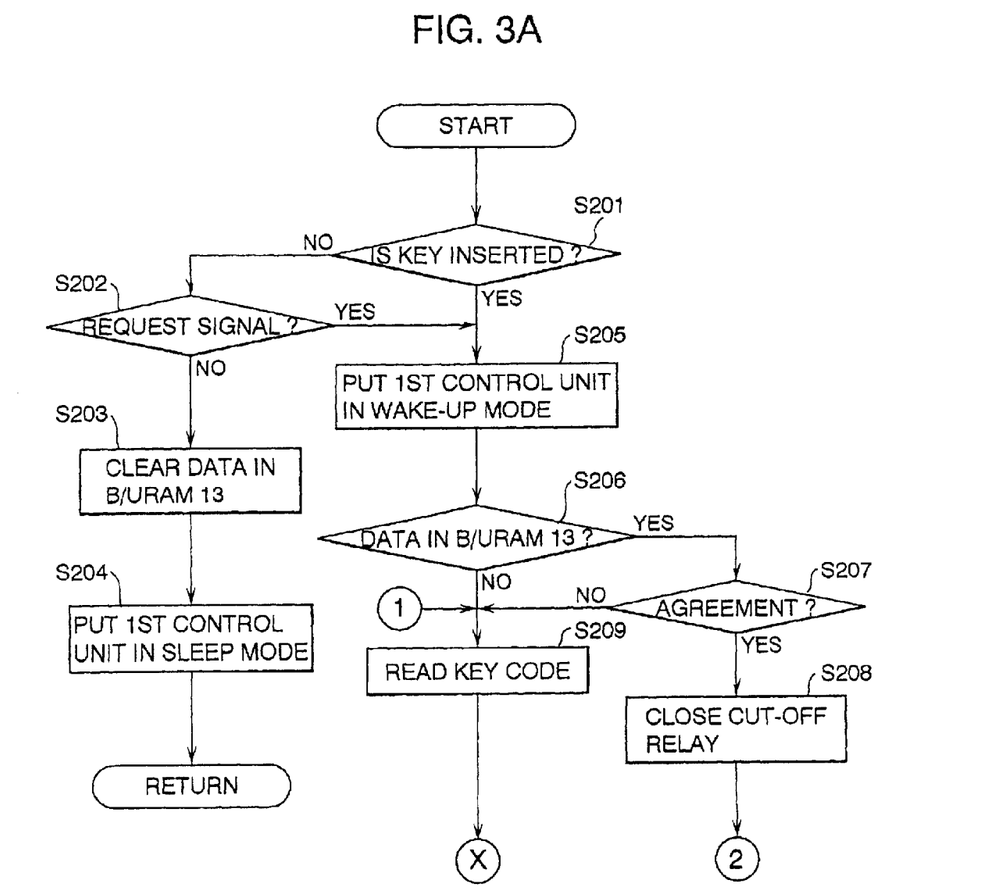
FIGS. 3A to 3C are the respective parts of a flow chart illustrating a sequence routine of a first control unit that forms a part of an anti-theft system.
Figure 3B:
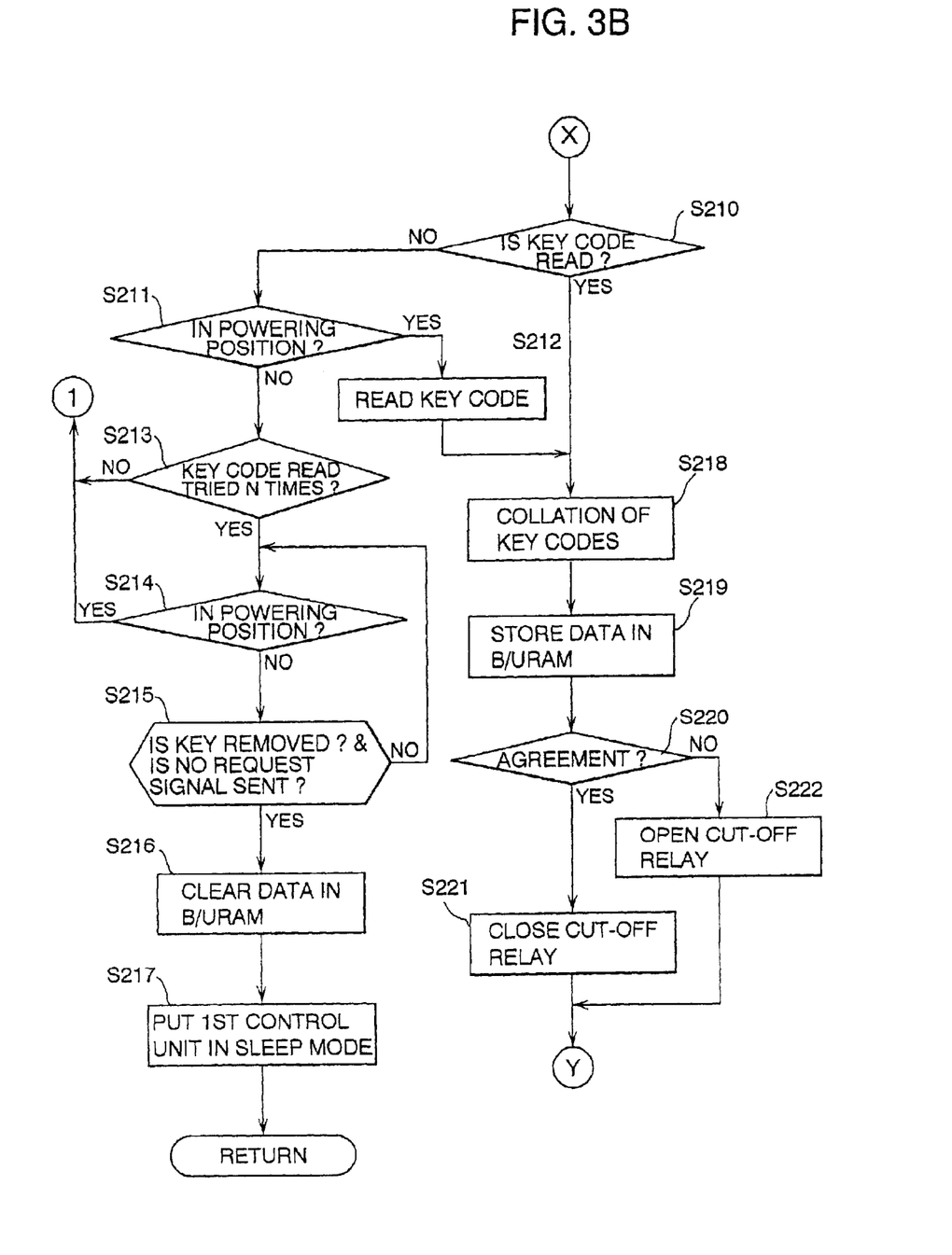
Figure 3C:
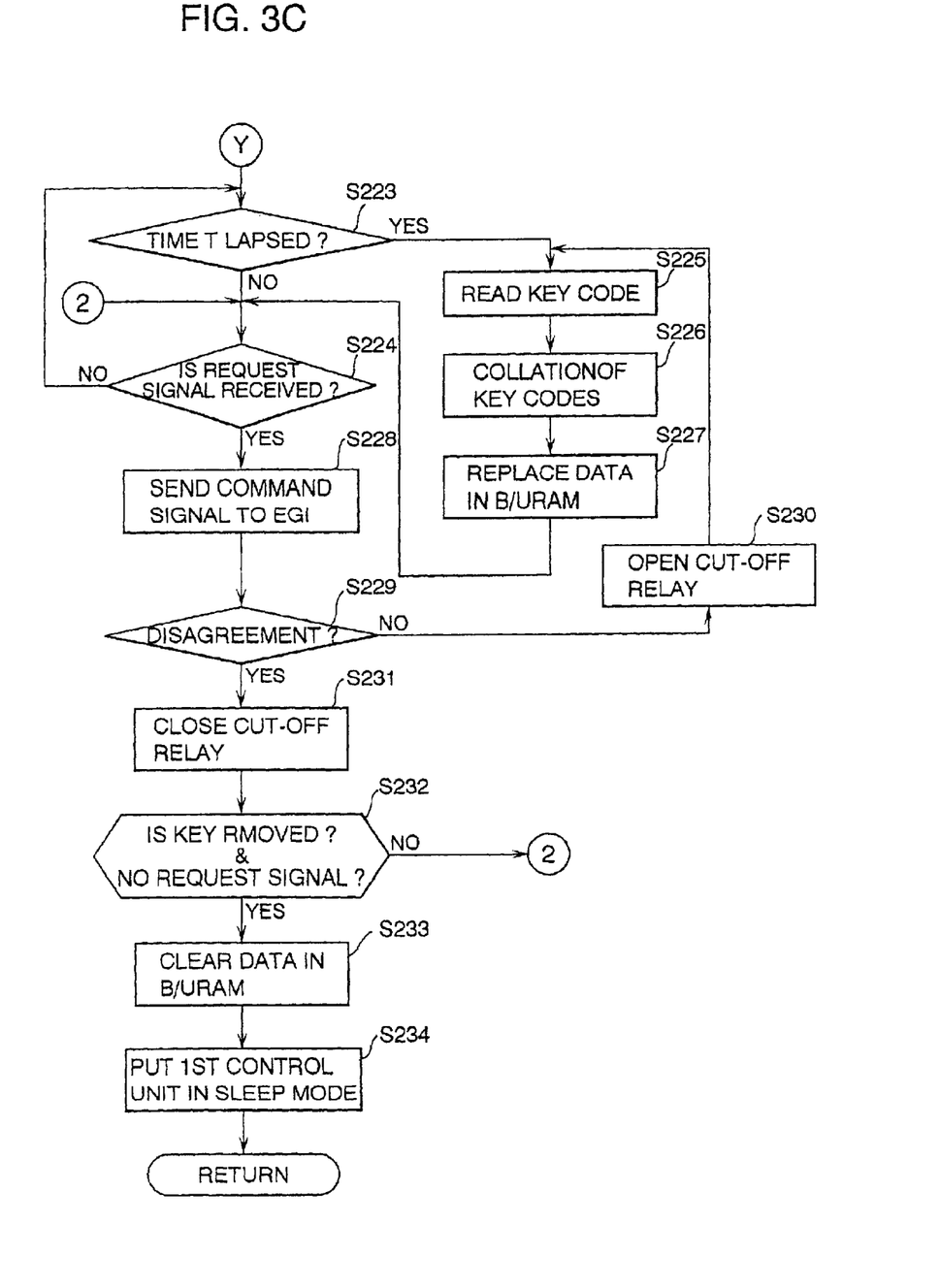
Figure 4A:
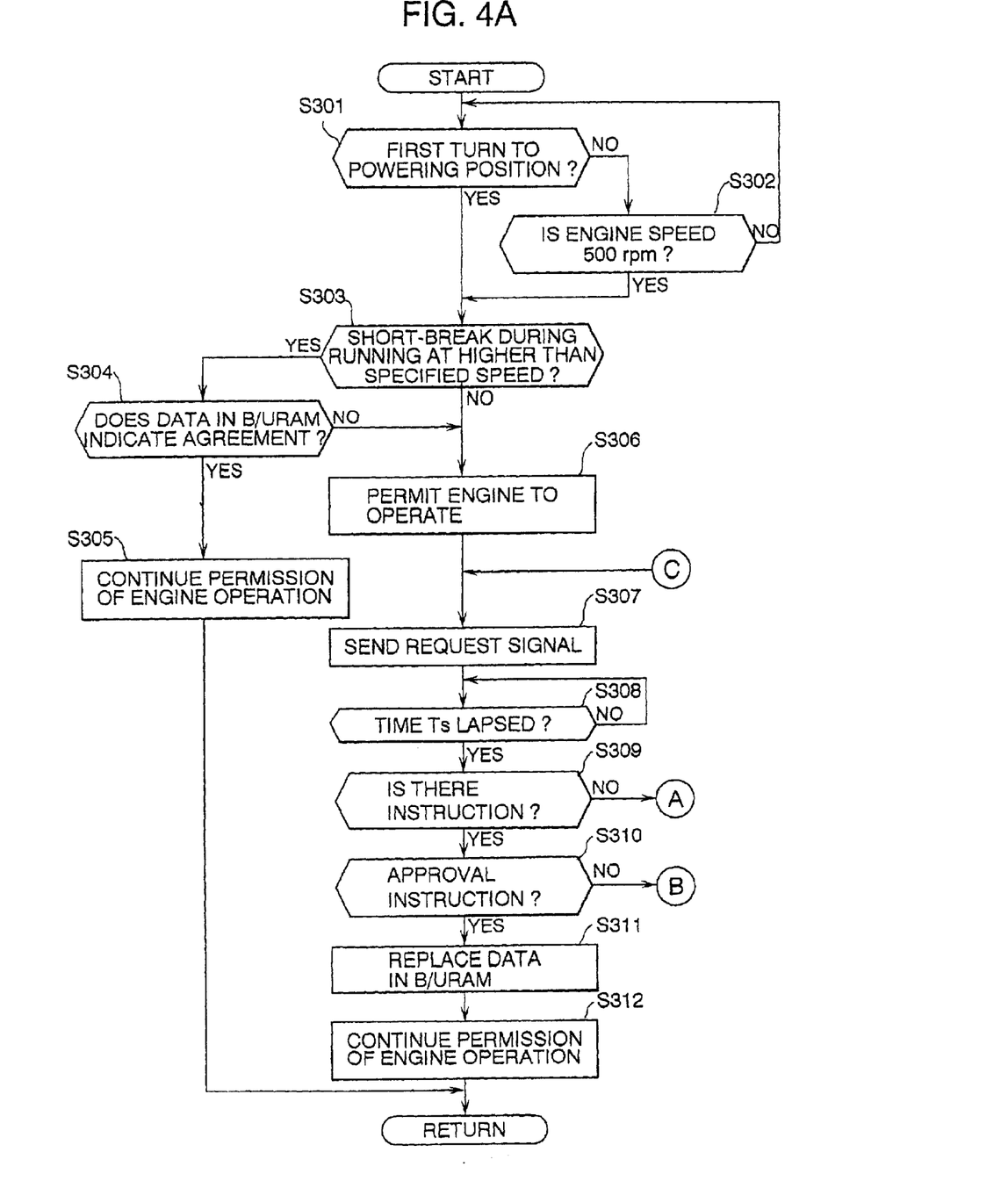
FIGS. 4A and 4B are the respective parts of a flow chart illustrating a sequence routine of a second control unit that forms another part of the anti-theft system.
Figure 4B:
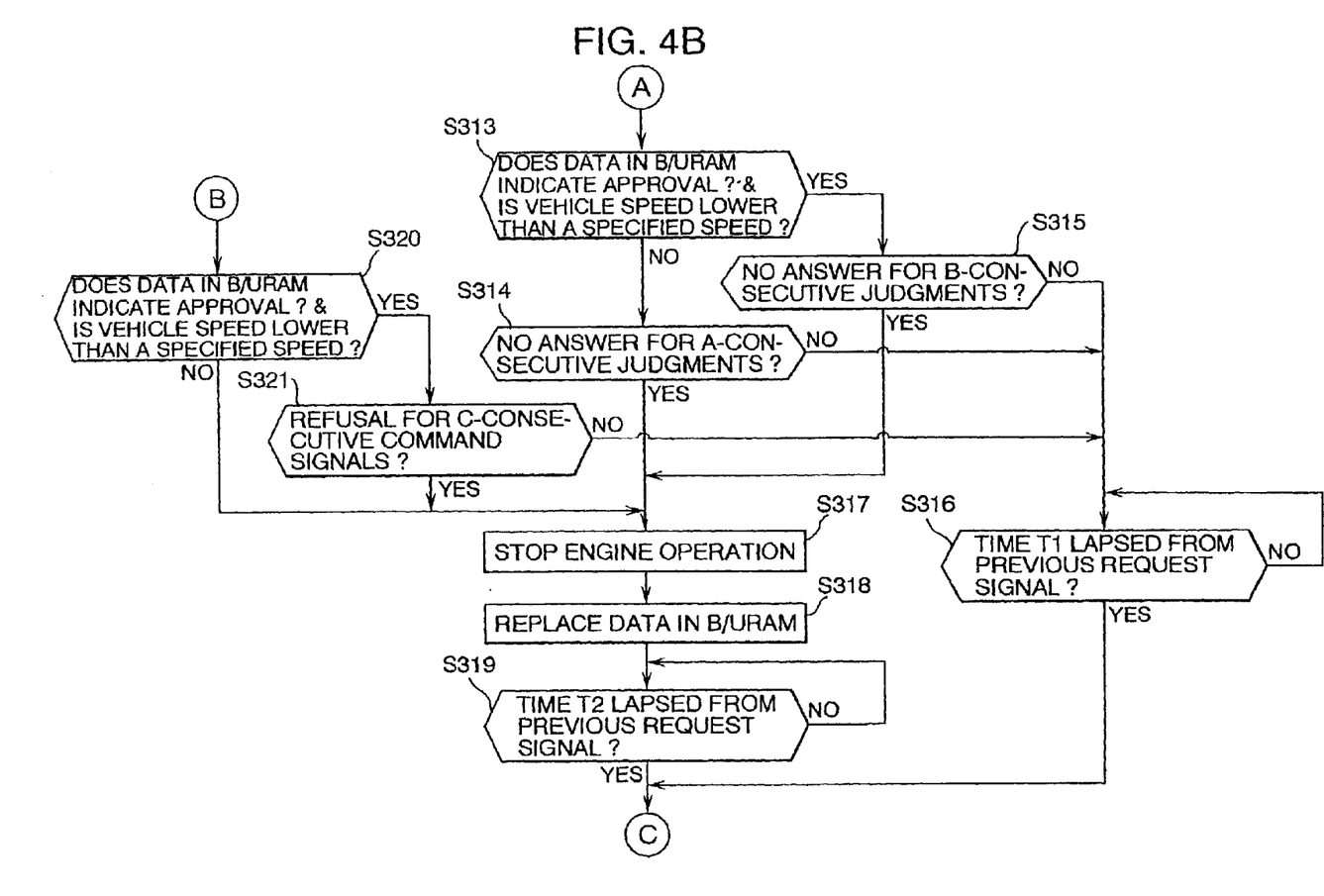

FIGS. 3A to 3C and 4A and 4B are flow charts illustrating a sequence routine of anti-theft system control according to the preferred embodiment of the present invention shown in FIG. 1. Specifically, FIGS. 3A, 3B and 3C are the respective parts of the flow chart illustrating part of the sequential routine of the anti-theft system control that the first control unit U1 performs and FIGS. 4A and 4B are the respective parts of the flow chart illustrating part of the sequential routine of the anti-theft system control that the second control unit U2 performs.

As shown in FIGS. 3A to 3c, when the sequence logic commences and control proceeds directly to a judgment at step S201 as to whether or not a key has been inserted in the ignition switch IGS. When the answer to the judgment is negative, this indicates that no key is in the ignition switch IGS, then, a further judgment is subsequently made at step S202 as to whether or not there is a request signal from the second control unit U2. When the answer to the judgment is negative, after clearing data having been stored in the B/URAM 13 at step S203, the first control unit U1 is put in a sleep mode at step S204.

On the other hand, the answer to the judgment as to key insertion made at step S201 is affirmative or the answer to the judgment as to a presence of the request signal made at step S202, this indicates that a key has been properly inserted in the ignition switch IGS, then, after waking up the first control unit U1 at step S205, a judgment is made at step S206 as to whether or not there is data stored in the B/URAM 13. When the answer to the judgment is negative, after reading in an individual key code at step S209, a judgment is made at step S210 as to whether or not an individual key code has been duly read in. When the answer is affirmative, then, a collation is made between the individual key code and the reference key code stored in the EEPROM 12 at step S218. Subsequently, storing a result of the collation, i.e. agreement or disagreement, at step S219, a judgment is made at step S220 as to whether or not the collation result is agreement. When the answer is affirmative, the cut-off relay 6 is closed or turned on to place the starter motor 5 in condition for operation at step S221. On the other hand, if the answer to the judgment as to the collation result made at step S220 is negative, this indicates that the key put in the ignition switch IGS is not intrinsic, then, the cut-off relay 6 is opened or turned off to prevent operation of the starter motor 5.

After closing or turning on the cut-off relay 6 at step S221 or opening or turning it off at step S222, a judgment is made at step S223 as to whether or not a specified latency time has lapsed. The answer is negative in an initial routine, then, a judgment is subsequently made at step S224 as to whether or not there is a request signal provided by the second control unit U2 and received by the first control unit U1. A presence of a request signal spells that the second control unit has duly started. In the event where there is no request signal received by the first control unit U1, another judgment as to the specified latency time is repeated at step S223. On the other hand, when the answer to the judgment as to a lapse of the specified latency time made at step S223 is affirmative, after reading in an individual key code again at step S225, a collation is made between the individual and reference key codes at step S226. Subsequently, at step S227, the previous collation result in the B/URAM 13 of the first control unit U1 is replaced with the collation result obtained at step S226. Subsequently, the sequence logic proceeds to steps S224 through S234.

On the other hand, when the answer to the judgment as to a request signal made at step S224 is affirmative, then, after sending an approval instruction or refusal according to the data relating to the collation result, i.e. agreement or disagreement, that is stored in the B/URAM 13, to the second control unit U2 at step S228, a judgment is made at step S229 as to whether or not the collation result stored in the B/URAM 13 and sent to the second control unit U2 indicates disagreement. When the answer is affirmative, after opening or turning off the cut-off relay 6 at step S230, the sequence logic proceeds to step S225 to read in the individual key code. On the other hand, when the answer to the judgment as to the information that is sent to the second control unit S2 made at step S229 is negative, after closing or turning on the cut-off relay 6 at step S231, a judgment is made at step S232 as to whether or not the key has been removed from the ignition switch IGS and there is no request signal from the second control unit U2. When the answer is negative, this indicates that the key is still in the ignition switch IGS and there is a request signal sent from the second control unit U2, then, the sequence logic proceeds to steps S224 through S231. However, when the answer is affirmative, after clearing the data in the B/URAM 13 at step S233 and subsequently putting the first control unit U1 in the sleep mode at step S234, the sequence logic orders return for another control routine of the first control unit U1.

When the answer to the judgment as to a presence of data in the B/URAM 13 made at step S206 is affirmative, a judgment is made at step S207 as to whether or not the collation result stored in the B/URAM 13 indicates agreement. When the answer is affirmative, after closing or turning on the cut-off relay 6 at step S229, the sequence logic proceeds the judgment as to reception of a request signal by the first control unit U1 at step S224. On the other hand, when the answer is negative, then, after reading in an individual key code at step S209, the sequence logic precedes the judgment as to as to whether or not an individual key code has been duly read in made at step S210.

When the answer is negative, a further judgment is made at step S211 as to whether or not the key occupies the powering position. When the answer is affirmative, i.e. when the key is in the powering position, after reading in an individual key code at step S209, the judgment as to a collation between the individual key code and the reference key code stored in the EEPROM 12 is made at step S218 as was previously described. On the other hand, when the answer is negative, a judgment is made at step S213 as to whether or not reading-in an individual key code has been tried a predetermined number of times. When the answer is affirmative, this indicates that the individual key code fails to be read in even after the predetermined number of trials, then, a further judgment is made at step S214 as to whether or not the key occupies the powering position. In an event where the answer to the judgment made at step S213 is negative, this indicates that the predetermined number of trials of reading in an individual key code has not yet completed, or in an event where, the answer to the judgment made at step S214 is affirmative, this indicates that the key occupies the powering position only after the predetermined number of trials of reading in an individual key code, then, the sequence logic proceeds to step S209 in order to read in an individual key code.

When the answer to the judgment as to the key position made at step S214 is negative, a further judgment is made at step S215 as to whether or not the key has been removed from the ignition switch IGS and there is no request signal provided by the second control unit U2 and received by the first control unit U1. As long as either one of the conditions is unsatisfied at step S215, i.e. the answer is negative, the judgment as to the powering position occupied by the key is repeated at step S214. On the other hand, when the answer is affirmative, after clearing the B/URAM 13 at step S216 and putting first control unit U1 in the sleep mode at step S217, the sequence logic orders return for another control routine of the first control unit U1.

As shown in FIGS. 4A and 4B, when the sequence logic commences and control proceeds directly to a judgment at step S301 as to whether or not the key is turned to turn on the main power switch 2 for the first time after the insertion of the key in the ignition switch IGS, in other words, whether or not the key is not turned back to the powering position from the starting position. When the answer is affirmative, a judgment is subsequently made at step S303 as to whether or not there is an occurrence of a short break in power supply and the vehicle travels at a speed higher than a specified speed. When the answer is negative, this indicates that there is no short break in power supply, then, after permitting the engine to operate at step S306, a request signal is sent to the first control unit U1 at step S307. Subsequently, after a lapse of a specified time Ts at step S308, a judgment is made at step S309 as to whether or not there is an instruction from the first control unit U1 in response to the request signal from the second control unit U2, in other words, whether or not the second control unit U2 receives an approval instruction or a refusal instruction from the first control unit U1. When the answer is affirmative, a judgment is subsequently made at step S310 as to whether the instruction is approval. When the answer is affirmative, after replacing the previous data in the B/URAM 22 of the second control unit U2 with data of the approval instruction at step S311 and keeping the engine operating at step S312, the sequence logic orders return for another control routine of the second control unit U2.

On the other hand, when the answer to the judgment as to the first turn of the key to the powering position made at step S301 is negative, then, a judgment is made at step S302 as to whether the engine attains the specified speed of 500 rpm that is obtained upon an occurrence of a complete explosion. When the answer is negative, the judgment as to the first turn of the key to the powering position is repeated at step S301 until the engine attains the specified speed of 500 rpm.

When the answer to the judgment as to a short break in power supply and a vehicle speed made at step S303 is affirmative, a further judgment is made at step S304 as to whether or not data stored in the B/URAM 22 of the second control unit U2 indicates approval. When the answer is affirmative, after keeping the engine operating at step S305, the sequence logic orders return for another control routine of the second control unit U2. On the other hand, when the answer is negative, the sequence logic proceeds to step S306 to permit the engine to operate.

When the answer to the judgment as to a presence of an instruction from the first control unit U1 in response to the request signal from the second control unit U2 made at step S309 is negative, this indicates that there is no instruction from the first control unit U1 in response to the request signal from the second control unit U2, then, the sequence logic proceeds to step S313 where a judgment is made as to whether or not a vehicle speed is higher than the specified speed and the data stored in the B/URAM 22 of the second control unit U2 indicates approval. When the answer is negative, a further judgment is subsequently made at step S314 as to whether or not there is no answer for a predetermined number of consecutive judgments (A). When the answer is affirmative, after stopping the engine at step S317, the previous data in the B/URAM 22 of the second control unit U2 is replaced with data of the refusal instruction at step S318. Subsequently, after waiting a lapse of a specified time T2 from sending the previous request signal to the first control unit U1 at step S319, the sequence logic proceeds to steps S307 through S312.

Further, when the answer to the judgment as to the approval instruction that is sent to the second control unit U2 from the first control unit U1 in response to the request signal made at step 310 is negative, i.e. when the instruction received by the second control unit U2 indicates refusal, then, the sequence logic proceeds to step S320 where a judgment is made as to whether or not the data in the B/URAM 22 of the second control unit U2 indicates approval and the vehicle travels at a speed higher than the specified speed. When the answer is negative, the sequence logic proceeds to steps S307 through S312 via steps S317 through S319. On the other hand, when the answer is affirmative, a further judgment is made at step S321 as to whether or not a predetermined number of refusal instructions (C) are consecutively received by the second control unit U2. When the answer is affirmative, the sequence logic proceeds to steps 307 through S312 via steps S317 through S319. When the answer to the judgment as to a vehicle speed and the data stored in the B/URAM 22 of the second control unit U2 made at step S313 is affirmative, a further judgment is made at step S315 as to whether or not there is no answer for a predetermined number of consecutive judgments (B) which is greater than the predetermined number of consecutive judgments (A). When the answer is affirmative, the seqnce logic proceeds to steps 307 through S312 via steps S317 through S319.

In the event where the answer to the judgment as to the predetermined number of consecutive judgments (A) which is smaller than the at step S314, the answer to the judgment as to the predetermined number of consecutive judgments (B), or the answer to the judgment as to consecutive reception of the predetermined number of refusal instructions (C) by the second control unit U2 at step S321 is negative, after waiting a lapse of a specified time T1 from sending the previous request signal at step S316, the sequence logic proceeds to steps S307 through S312.

Figure 5:
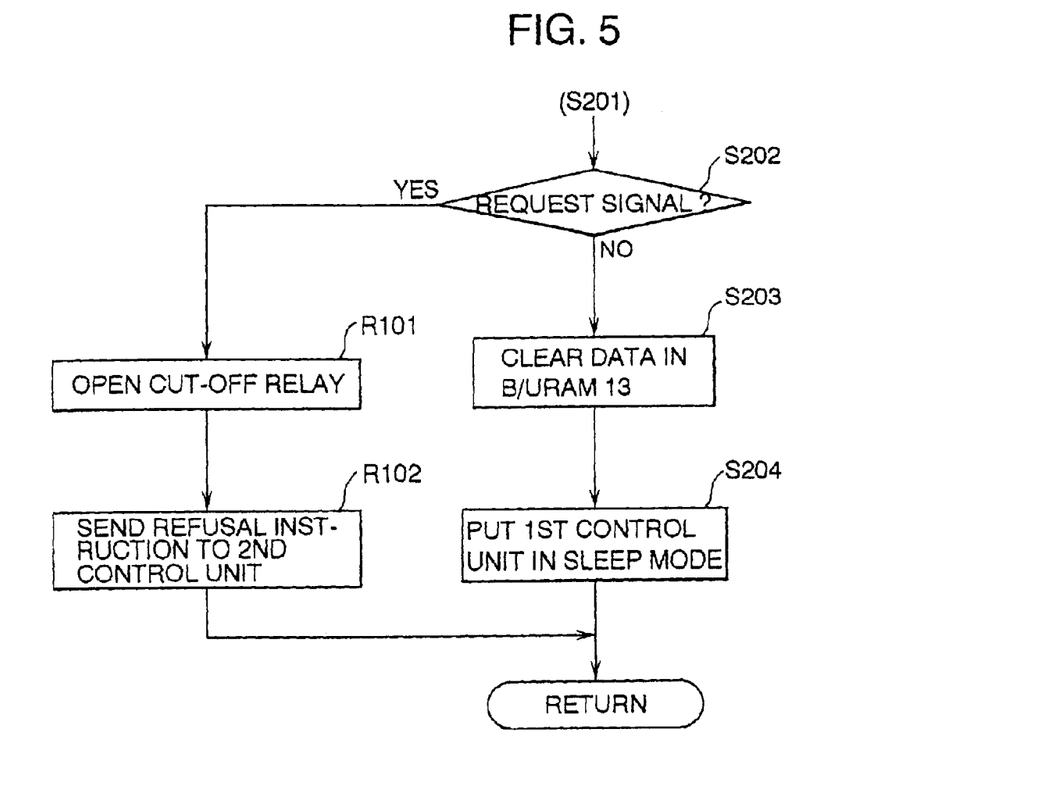
FIG. 5 is a flow chart illustrating a variant of the sequence routine of the first control unit.

FIG. 5 shows a variant of the part of the flow chart shown in FIG. 3A following the judgment as to a request signal from the second control unit U2 made at step S202. That is, when the answer to the judgment as to a request signal from the second control unit U2 made at step S202 is affirmative, after opening or turning on the cut-off relay 6 at step RIO and sending an refusal instruction to the second control unit U2 at step R102, the sequence logic orders return for another control routine of the first control unit U1.

Figure 6:
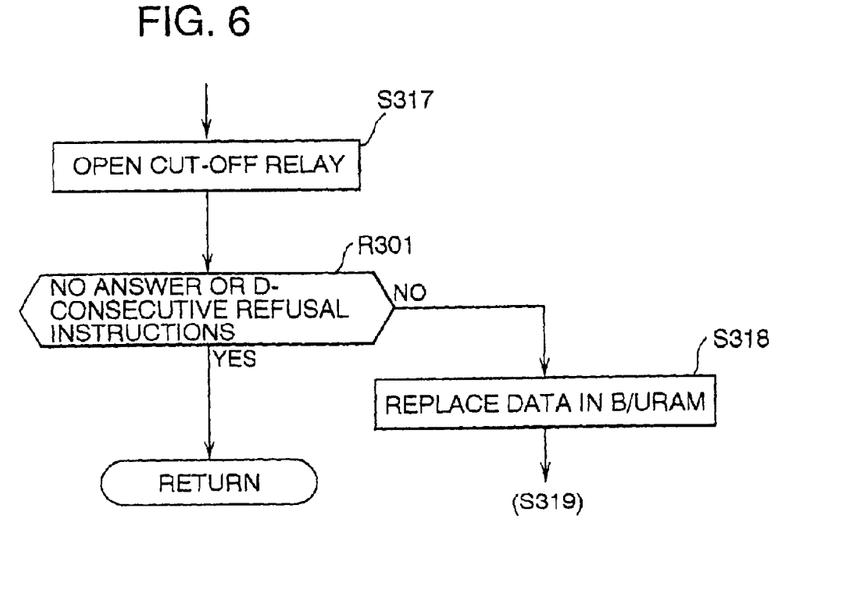
FIG. 6 is a flow chart illustrating another variant of the sequence routine of the first control unit.

FIG. 6 shows another variant of the part of the flow chart shown in FIG. 4B following a stop of the engine at step S317. That is, after stopping the engine at step S317, a judgment is made at step R301 as to whether or not a predetermined number of refusal instructions (D) or there is no answer from the first control unit U1. When the answer is affirmative, the sequence logic orders return for another control routine of the first control unit U2. On the other hand, when the answer is negative, the sequence logic proceeds to steps S307 through S312 via step S319 shown in FIGS. 4A and 4B.

Figure 7:
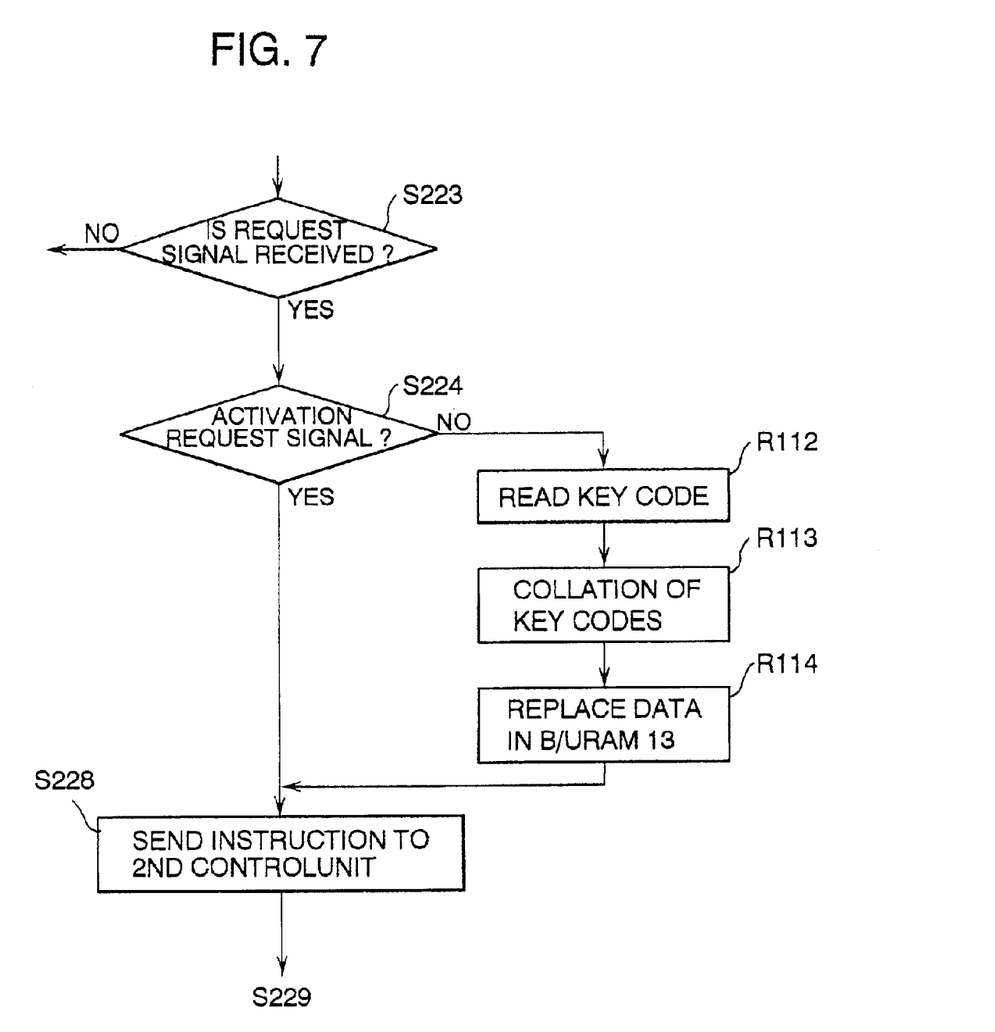
FIG. 7 is a part of a flow chart illustrating another sequence routine of the first control unit.
Figure 8:
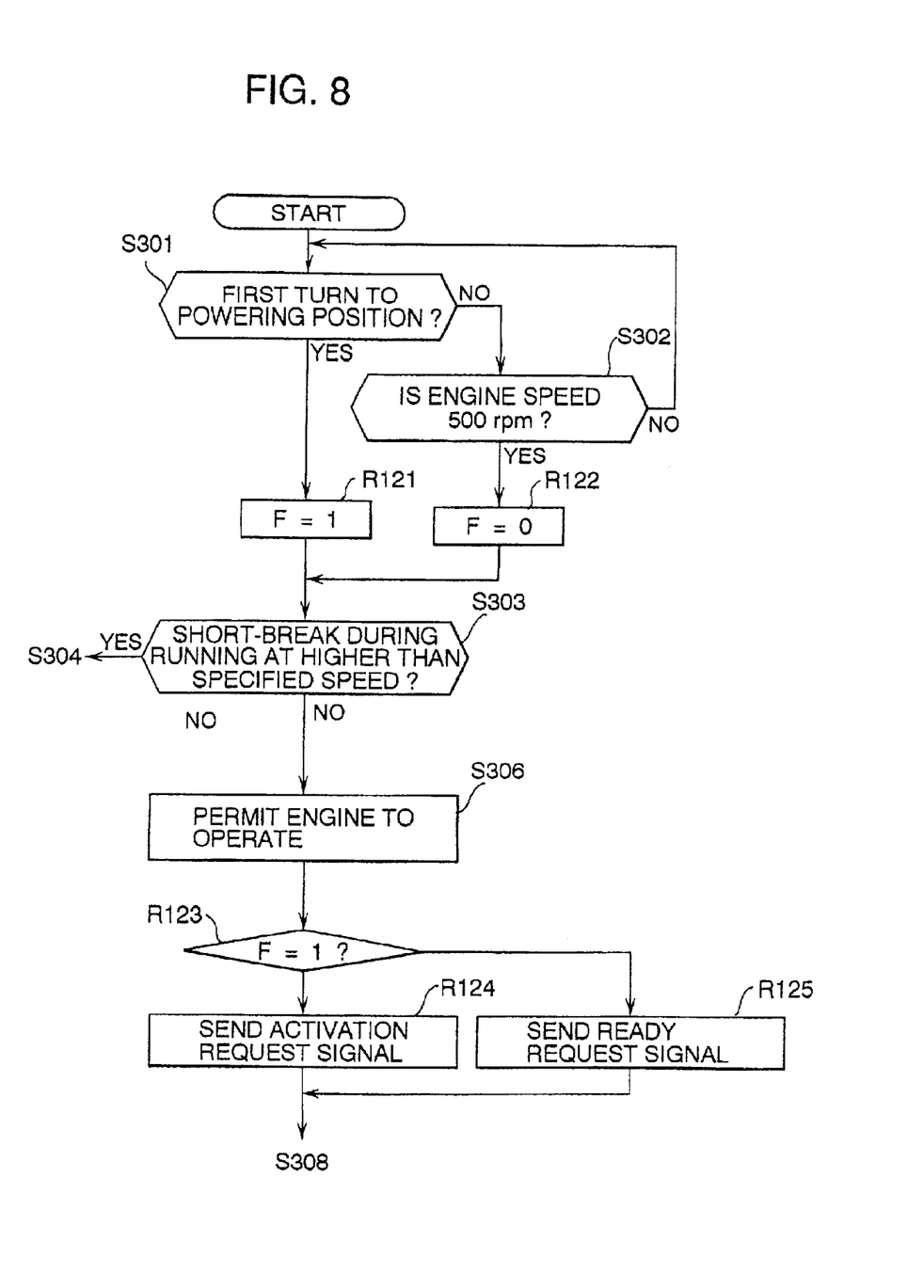
FIG. 8 is a part of a flow chart illustrating another sequence routine of the second control unit.

FIGS. 7 and 8 show another variant of the sequential routine of the anti-theft system control illustrated by the flow charts shown in FIGS. 3A to 3C and 4A and 4B. Specifically, FIG. 7 shows part following the judgment as to a request signal from the second control unit U2 made at step S224. FIG. 8 shows a variant of the part of the flow chart shown in FIG. 4A in which a request signal is sent to the first control unit U1 from the second control unit U2 both upon activation of the second control unit and when the engine attains a specified speed of rotation which is such as a lowest speed for vehicle travel, for example 500 rpm, that is obtained during continue complete explosion. In this instance, an activation request signal refers to a request signal that is sent to the first control unit U1 when the second control unit U2 is activated, and a ready request signal refers to a request signal that is sent to the first control unit U1 when the engine attains the specified speed of rotation ready for vehicle travel.

That is, as shown in FIG. 7, when the answer to the judgment as to a request signal from the second control unit U2 made at step S224 is affirmative, a judgment is made at step R111 as to whether or not the request signal is an activation request signal. When the answer is negative, after reading in an individual key code at step R112, a collation is made between the individual and reference key codes at step R113. Subsequently, at step R114, the previous collation result in the B/URAM 13 of the first control unit U1 is replaced with the collation result obtained at step R113. Subsequently, the sequence logic proceeds to step S230 where information relating to the new collation result, i.e. agreement or disagreement, in the B/URAM 13 is sent to the second control unit U2 at step S228.

Further, as shown in FIG. 8, when the answer to the judgment as to whether or not the key is turned to the powering position for the first time is affirmative, this indicates that the key is not turned back to the powering position from the starting position but is turned to the powering position for the first time, then, a start flag F is set up to a state of "1" at step R121. On the other hand, when the answer is negative, after waiting attainment of the specified engine speed of 500 rpm at step S302, the start flag F is reset down to a state of "0" at step R122. In this instance, the start flag F indicates that the engine is being started when it is up and that the engine has attained the specified speed of rotation when it is down.

After setting up or down the start flag F at step R121 or at step R122, a judgment is made at step S303 as to whether or not there is an occurrence of a short break in power supply and the vehicle travels at a speed higher than a specified speed. When the answer to the judgment is affirmative, the sequence logic proceeds to steps S304 through S312 previously described in connection with the flow chart shown in FIG. 3A. On the other hand, when the answer is negative, after permitting the engine to operate at step S306, a judgment is made at step R123 as to whether or not the start flag F is up. When the start flag is up, an activation request signal is sent to the first control unit U1 at step R124. On the other hand, when the start flag F is down, a ready request signal is sent to the first control unit U1 at step R125. Subsequently, after sending an activation request signal or a ready request signal to the first control unit U1, the sequence logic proceeds to steps S308 through S312 previously described in connection with the flow chart shown in FIG. 3A.

Summarizing the sequence routine of the anti-theft system control described above, after reading in a key code (step S209) following insertion of a key (step S201), a collation is made between the key code and a reference key code (step S218). Data of a collation result of the key code with the reference key code is stored in B/URAM 13 of the first control unit U1 (step S219). According to the collation result, the cut-off switch 6 is closed or turned on (step S208, S221 or S231) or opened or turned off (step S222 or S230). Further, upon reception of a request signal by the first control unit U1 (step S224), when the predetermined time has lapsed (step S223) after having once sent an approval instruction or refusal to the second control unit U2 (step S228), a collation is made between another request signal read in (step S225) and the reference key code (step S226), and data of the previous collation result is replaced with data of the latest collation result (step S227). Upon reception of another request signal, an instruction is sent to the second control unit U2 according to the latest collation result.

In the event where there is no instruction from the first control unit U1 in response to the request signal from the second control unit U2 (step S309) or an instruction received by the second control unit U2 indicates refusal (step S310), a request signal is repeatedly sent to the first control unit U1 (step S307) until the main power switch 2 is turned off (step S316 or S319).

The fact that the answer to the judgment as to a vehicle speed and the data previously stored in the B/URAM 22 of the second control unit U2 is affirmative (step S313 or S320) signifies less possibility of the vehicle having been stolen. The specified time T1 (step S316) is set to be shorter than the specified time T2 (step S319) with an intention of shortening a request signal output period for a little possibility of the vehicle having been stolen than for a high possibility of the vehicle having been stolen so as thereby to increase chances for the vehicle to run as great as possible.

There has been fully disclosed improved anti-theft systems. While an illustrative embodiments of the present invention has been disclosed, it is to be understood that variants and other embodiments will be apparent to those of ordinary skill in the art and it is intended that this invention be limited only by scope of the appended claims.

What is claimed is:

1. An anti-theft system for a vehicle which comprises a first control unit operative to read in a first key code of an individual key through key code receiving means and a second control unit operative to control operation of an engine of the vehicle, said first control unit comprising:

detection means for detecting an activation timing at which said second control unit is activated;

first memory means for storing data of a second key code as a reference key code of an intrinsic key exclusive to said engine therein;

collation means for making collation between said first key code read in through said key code receiving means and said second key code in said first memory means so as to determine agreement or disagreement between said first key code and said second key code before activation of said second control unit;

second memory means for storing data of a result of said collation therein;

controlling means for, when said detecting means detects said activation of said second control unit, providing said second control unit with an instruction of approval to operate said engine when said collation results in agreement between said first key code and second key code and an instruction of refusal in engine operation when said collation results in disagreement between said first key code and said second key code;

activation means activated by the key for activating said first control unit in an event where said first control unit is out of activation when receiving a reaqest signal provided at a speed attaining timing from said second control unit;

wherein said second control unit provides for said first control unit a request signal both at said activation timing and at said speed attaining timing, said first control unit provides for the second control unit one of said instruction of approval and said instruction of refusal in response to recepnt of said request signal.

2. An anti-theft system for a vehicle as defined in claim 1, wherein said first control unit provides for said second control unit said instruction of refusal in an event where said first control unit is out of activation when said first control unit receives said request signal.

3. An anti-theft system for a vehicle as defined in claim 1, wherein said first control unit rereads in said first key code when receiving said request signal provided at said speed attaining timing from said second control unit, said collation means makes another collation between said reread first key code and said second key code in said first memory means to determine agreement or disagreement between said reread first key code and said second key code, and said control means provides said second control unit with one of said instruction of approval and said instruction of refusal according to a result of said other collation between said reread first key code and said second key code.

4. An anti-theft system for a vehicle as defined in claim 1, wherein said first control unit prohibits said collation means from making said collation between said first key code and said second key code when failing to read in said first key code while said key is out of an ignition position and forcibly treats a result of said collation between said first key code and said second key code as disagreement when failing to read in said first key code while said key is in said ignition position.

5. An anti-theft system for a vehicle as defined in claim 1, wherein said first control unit tries to read in said first key code through said key code receiving means either a predetermined number of times or for a predetermined period of time when failing to read in said first key code while no turn of said key is detected and discontinues reading in said first key code through said key code receiving means when failing to read in said first key code even after said predetermined number of trials.

6. An anti-theft system for a vehicle as defined in claim 1, wherein said second memory means is such as to hold data therein upon an occurrence of a short break in power supply to said first control unit.

7. An anti-theft system for a vehicle which comprises a first control unit operative to read in a first key code of an individual key through key code receiving means and a second control unit operative to control operation of an engine of the vehicle, said first control unit comprising:

detection means for detecting an activation timing at which said second control unit is activated;

first memory means for storing data of a second key code as a reference key code of an intrinsic key exclusive to said engine therein;

collation means for making collation between said first key code read in through said key code receiving means and said second key code in said first memory means so as to determine agreement or disagreement between said first key code and said second key code before activation of said second control unit;

second memory means for storing data of a result of said collation therein; and controlling means for, when said detecting means detects said activation of said second control unit, providing said second control unit with an instruction of approval to operate said engine when said collation results in agreement between said first key code and second key code and an instruction of refusal in engine operation when said collation results in disagreement between said first key code and said second key code;

wherein said first control unit is provided with a cut-off relay which operates to supply power to a starter motor of said engine when closed and to cut off said power supply from said starter motor when opened and which is open in an initial condition of said first control unit and provides for said second control unit said instruction of approval when said collation results in agreement between said first key code and said second key code and said instruction of refusal in engine operation when said collation results in disagreement between said first key code and said second key code, and wherein said first control unit controls said cut-off relay to close when said collation result in agreement between first key code and said second key code and to open when said collation result in disagreement between said first key code and said second key code and said second control unit is placed in condition for operating said engine upon activation thereof.

8. An anti-theft system for a vehicle as defined in claim 7, wherein said first control unit provides for said second control unit either one of said instruction of approval and said instruction of refusal only upon reception of said request signal from said second control unit.

9. An anti-theft system for a vehicle as defined in claim 8, wherein said second memory means is such as to hold said data of said result of said collation therein upon an occurrence of a short break in power supply thereto and said first control unit controls said cut-off relay according to said result of said collation upon an occurrence of a short break in power supply to said first control unit.

10. An ant-theft system for a vehicle which comprises a first control unit operative to read in a first key code of an individual key through key code receiving means and a second control unit operative to control oneration of an engine of the vehicle, said first control unit comprising:

detection means for detecting an activation timing at which said second control unit is activated;

first memory means for storing data of a second key code as a reference key code of an intrinsic key exclusive to said engine therein;

collation means for making periodic collation between said first key code read in through said key code receiving means and said second key code in said first memory means so as to determine agreement or disagreement between said first key code and said second key code before activation of said second control unit;

second memory means for storing data of a result of said collation therein; and controlling means for, when said detecting means detects said activation of said second control unit, providing said second control unit with an instruction of approval to operate said engine when said collation results in aareement between said first key code and second key code and an instruction of refusal in engine operation when said collation results in disagreement between said first key code and said second key code;

wherein said first control unit reads in said first key code at said activation timing and a specified timing in a specified period, said collation means makes a collation between said first key code and said second key code to determine agreement or disagreement between said first key code and said second key code, said second memory means replace data of a result of said collation previously stored therein with data of a latest result of said collation, and said second control unit is prevented from being deactivated immediately at least when said periodic collation results in disagreement.

11. An anti-theft system for a vehicle for a vehicle as defined in claim 10, wherein said first control unit is provided with a cut-off relay which operates to supply power to a starter motor of said engine when closed and to shut off said power from said starter motor when opened and said first control unit controls said cut-off relay to close when said collation results in agreement so as to permit said starter motor to operate and to open when said collation results in disagreement so as to prohibit said starter motor from operating.

12. An anti-theft system for a vehicle which comprises a first control unit operative to read in a first key code of an individual key through key code signal receiving means and a second control unit operative to control operation of an engine of the vehicle and to provide said first control unit with a request signal so that said first control unit provides said second control unit with either one of an instruction of approval to operate said engine and an instruction of refusal in engine operation in response to receipt of said request signal, said first control unit comprising:

first memory means for storing data of a second key code therein;

collation means for making a collation between said first key code read and said second key code so as to determine agreement or disagreement between said first key code and said second key code;

second memory means for storing data of a result of said collation therein; and controlling means for providing said second control unit with said instruction of approval when said collation results in agreement between said first key code and said second key code and with said instruction of refusal when said collation results in disagreement between said first key code and said second key code;

wherein said first control unit reads in said first key code at first and second timings, said first timing being a point of time at which said first control unit is activated and said second timing being a specified point of time after providing said second control unit with either one of said instruction of approval and said instruction of refusal in response to receipt of said request signal from said second control unit, and said second memory means replaces data of a result of said collation previously stored therein with data of a latest result of said collation;

wherein said second control unit provides said first control unit with said request signal at first and second timings, said first timing being a point of time at which said second control unit is activated and said second timing being a point of time after said first control unit provides for said second control unit either one of said instruction of approval and said instruction of refusal, and continues providing for said first control unit said request signal provided at said second timing until said key is turned to a position wherein said first and second control units are shut off from power supply.

13. An anti-theft system for a vehicle as defined in claim 12, wherein said second control unit provides said first control unit with said request signal a predetermined number of times when receiving said instruction of refusal from said first control unit and when provided with neither said instruction of approval nor said instruction of refusal.

14. An anti-theft system for a vehicle as defined in claim 12, wherein said second control unit is placed in condition for operating said engine upon activation thereof and stops said engine at a timing once when receiving neither said instruction of approval nor said instruction of refusal from said first control unit upon providing said first control unit with said request signal, said timing of stopping said engine being retarded when said second control unit receives said instruction of approval in the last sequence routine than when said second control unit receives said instruction of refusal.

15. An anti-theft system for a vehicle as defined in claim 12, wherein said second control unit provides said first control unit with said request signal at regular intervals which are shorter while placed in condition for operating said engine than while stopping said engine.

* * * * *

UNITED STATES PATENT AND TRADEMARK OFFICE
CERTIFICATE OF CORRECTION

PATENT NO. : 6,777,826 B2
DATED : August 17, 2004
INVENTOR(S) : Atsushi Okamitsu et al.

It is certified that error appears in the above-identified patent and that said Letters Patent is hereby corrected as shown below:

Column 13,
Line 37, delete "reaqest" and insert therefor -- request --.
Line 45, delete "recepnt" and insert therefor -- receipt --.

Column 15,
Line 11, delete "oneration" and insert therefor -- operation --.
Line 31, delete "aareement" and insert therefor -- agreement --.

Signed and Sealed this

Eighteenth Day of January, 2005

JON W. DUDAS
*Director of the United States Patent and Trademark Office*